July 18, 1933.  W. A. MARRISON  1,918,977
SYNCHRONOUS MOTOR
Filed June 6, 1930
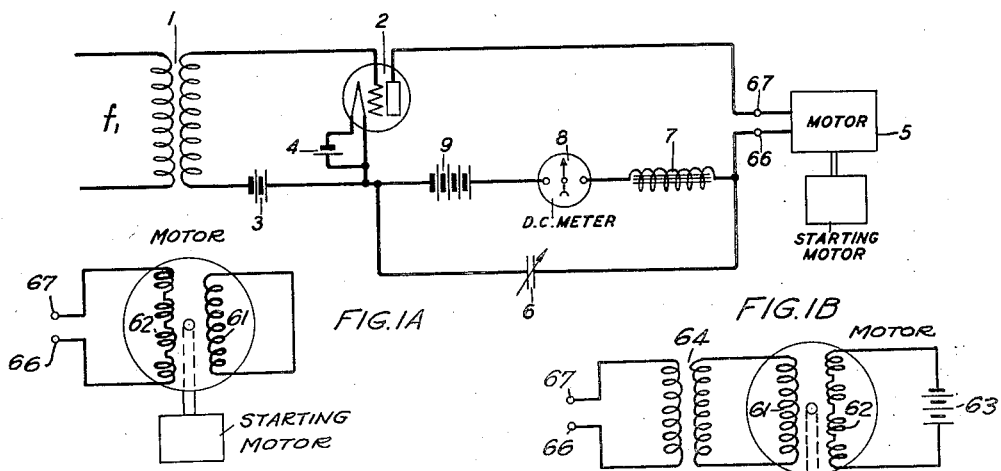
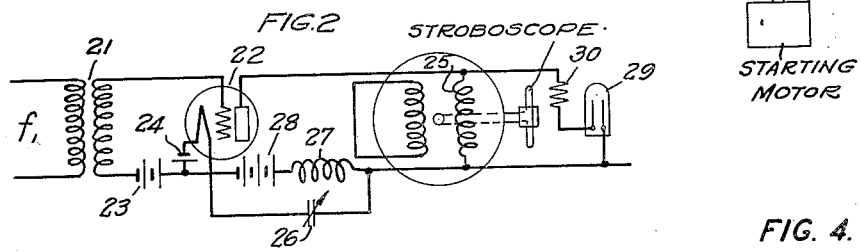
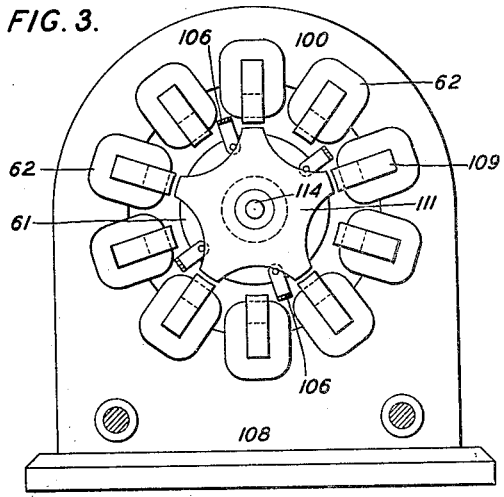 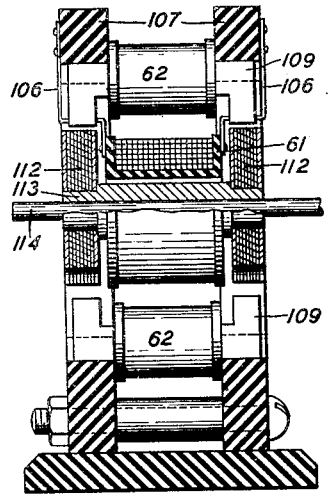
INVENTOR
W. A. MARRISON
BY Guy T. Morris
ATTORNEY Patented July 18, 1933

1,918,977

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

SYNCHRONOUS MOTOR

Application filed June 6, 1930. Serial No. 459,580.

This invention relates to synchronous motors, and more particularly to means for indicating when such a motor is running in synchronism.

The object of the invention is to provide means for indicating such a condition which shall be reliable, accurate, simple, and easy to operate.

A feature of the invention is the provision of a direct current meter in series with the winding of a synchronous motor in the output circuit of an electric space discharge device, to indicate during the starting period when the motor is running in synchronism with the impressed voltage.

A feature of a modified form of the invention is the provision of an electric discharge device, a neon tube, for example, connected across the windings of a synchronous motor in the output circuit of a space discharge repeating device, and of a condenser in series with the windings, the condenser having the proper capacity in cooperation with the inductance of the motor winding to tune the output circuit to the synchronizing frequency and thus produce maximum voltage across the electric discharge device, and across the motor.

In accordance with the principles of this invention as applied to the preferred embodiment, a space discharge repeating device is provided, on the input electrodes of which a synchronizing wave is impressed. In the output circuit of this device, the armature windings of a synchronous motor, a low frequency choke coil, and a direct current meter are connected in series with the plate voltage supply. The synchronizing frequency is impressed on the input electrodes of the device, which acts as an amplifier, and the resultant unidirectional impulse current in the output circuit may be used to supply the usual direct and alternating current for the synchronous motor. The back electromotive force generated by the armature of the synchronous motor, as its rotor is accelerated towards synchronous speed, is intermodulated in the plate circuit of the amplifier with the impressed voltage. When the motor is operating at a speed close to synchronism the intermodulations produce a difference frequency component of low frequency, to which the choke coil presents no appreciable impedance, which causes the pointer in the direct current meter to swing back and forth with the variations in the low frequency current. When the motor comes into step the back electromotive force is of the same frequency as the impressed voltage, the difference frequency component of modulation is zero, and the pointer comes to rest, indicating that synchronism has been reached, whereupon the starting means may be uncoupled from the synchronous motor, which will then begin to function as such.

The high frequency component of the current in the plate circuit is shunted around the plate voltage supply, direct current meter, and low frequency choke coil, through a condenser connected in parallel to these elements. For maximum power output to the motor this condenser is selected of such capacity that the circuit including the inductance of the motor and this condenser is tuned to the synchronizing frequency.

In an alternative form of the invention this last mentioned circuit is tuned as before to the synchronizing frequency, but instead of a direct current meter to indicate synchronism, a discharge device such as a neon lamp, for example, is connected across the armature winding. The flashes of this lamp, which occur once for each cycle of the synchronizing current, are used to illuminate the rotor poles, or a sectored disc mounted on the rotor, or in any other suitable manner, to observe for synchronism in accordance with the stroboscopic principle. The provision of the tuning condenser in series with the motor winding in this unit provides a maximum voltage across the discharge device.

In the drawing:

Fig. 1 is a circuit diagram showing a synchronous motor operated on the current in the output circuit of a three electrode space discharge device, with a direct current meter in the output circuit to observe for synchronism;

Figs. 1A and 1B are circuit diagrams showing two methods of connecting the motor to the circuit;

Fig. 2 is a circuit diagram showing a synchronous motor in the output circuit of a three electrode space discharge device, with a glow tube connected across the motor windings to observe for synchronism;

Fig. 3 is an end view of a special type of synchronous motor which may be used; and Fig. 4 is a side view of the motor of Fig. 3, partly in section.

In Fig. 1 an incoming frequency $f_1$ is impressed through the windings of transformer 1 on the input electrodes of three-electrode space discharge device 2, the control electrode of which is suitably biased by a battery 3 so that the device will operate as an amplifier for this wave. The cathode of the device is heated by a battery 4. In the output circuit of the device, connected to contact points 66 and 67, the windings of a motor 5, having inductance L, are connected in series with a condenser 6, which may be variable, having a capacity C. In shunt to condenser 6 is connected a low frequency choke coil 7, a direct current meter 8, and a plate battery 9. The relation of the inductance L of the motor windings, the capacity C of condenser 6, and the impressed frequency $f_1$ is such that at synchronism $$f^1 = \frac{1}{2\pi\sqrt{LC}},$$

so that the output path including inductance L and capacity C is tuned to the incoming frequency $f_1$. An auxiliary starting motor, illustrated in block, may be used to start the synchronous motor. This starting motor may, if desired, be a small induction motor built into the main frame of the synchronous motor, and separately excited.

One form of motor 5 is shown in Figs. 3 and 4. The stator 108 comprises magnets 100 having windings 62 upon U-shaped laminated cores 109. The stator magnets 100 are held in position by supporting members 107, which are preferably of insulating material, for example bakelite. The windings 62 of magnets 100 are so connected that considering either end of the motor any two adjacent poles are of opposite polarity, there being twice as many magnets 100 as salient poles on rotor 111. The rotor 111 comprises two discs 112 which may be of laminated steel, machined with five salient poles as shown in Fig. 3. The discs 112 are mounted on a core 113, preferably of soft iron, which may be bored for a shaft 114 and slotted radially to reduce eddy current losses. The rotor 111 rotates freely within a stationary coil 61 closely associated therewith. The coil and rotor are both mounted within and concentric with the stator 108. The coil 61 serves to energize the rotor 111.

The synchronous motor may be operated in various ways. For example, the leads from contacts 66, 67 may be connected to the winding 62 as shown in Fig. 1A. The direct component of the current serves to polarize the coils of winding 62, while the alternating component induces an alternating current in the coil 61. When operated in this manner the D.C. component must not be so great as to prevent a decrease of the flux in the magnetic circuits, as otherwise no current will be induced in coil 61. Preferably the flux in the magnetic circuits should not be allowed to reverse, in order to reduce hysteresis losses.

Another method of operation, as shown in Fig. 1B, is to connect the primary windings of a transformer 64 across the contacts 66, 67 and connect the secondary winding of the transformer to the winding 61 of the motor shown in Figs. 3 and 4, or to the A.C. winding of any synchronous motor. A separate direct current source 63 must be provided for the windings 62 in this case.

The motor shown in Figs. 3 and 4 is disclosed and claimed in my Patent No. 1,763,000 granted June 10, 1930. The operation of the motor generates in the A.C. windings a back electromotive force of a frequency proportional to the angular velocity of the rotor. There is thus present in the plate circuit of the vacuum tube the two frequencies $f_1$ and the frequency of this back electromotive force. These two waves are intermodulated in the plate circuit of the device, and as synchronism is approached the difference frequency product of modulation approaches a very low value. The choke coil 7 presents no impedance to this low difference frequency wave and the approach of the motor to synchronism with the incoming frequency is indicated by a swinging of the pointer of the direct current meter at the difference frequency of the two voltages. As exact synchronism is approached the difference frequency becomes smaller and the swinging of the pointer consequently slower, until at the point of exact synchronism the pointer comes to rest indicating that this condition obtains. During this synchronizing operation, and during the normal operation after synchronism is attained, the mean reading or the steady reading of the meter as the case may be indicates the plate current of device 2 supplied by the source 9. The meter therefore serves a dual function and obviates the necessity of using additional apparatus to indicate synchronism. The resultant economy is a distinctive characteristic of this invention.

In the circuit of Fig. 2 an incoming wave of frequency $f_1$ is impressed through the windings of transformer 21 on the input electrodes of three electrode space discharge device 22, the control electrode of which is suitably biased by a battery 23 to cause the device to function as an amplifier. The cathode of the device is heated by battery 24. In the output circuit of the device is included in series the windings 25 of a synchronous motor and a condenser 26. The inductance of the windings of the synchronous motor included in this circuit, and the capacity of the condenser 26, which may be variable, bear the same relation to the incoming frequency as the corresponding elements in Fig. 1, that is, such that $$f_1 = \frac{1}{2\pi\sqrt{LC}}.$$

In shunt to condenser 26 there is connected a low frequency choke coil 27 and a plate battery 28. In shunt to the motor windings 25 is connected a glow tube 29 which may be a neon lamp for example, and a resistance 30.

The windings 25 of the synchronous motor may be the same as those referred to in connection with Fig. 1. The output circuit including inductance 25 and capacity 26 being tuned to the incoming frequency $f_1$, there is a large voltage drop across the inductance 25, and this is impressed across the electrodes of the glow tube 29. The resistance 30 in series with the glow tube 29 is provided to limit the current flowing through the tube in accordance with the usual practice. Suitable stroboscopic means, indicated in block, may be provided in connection with the rotor of the synchronous motor and the glow tube for indicating when synchronism has been reached, as is shown for example in U. S. Patent 941,418, issued November 30, 1909, to G. A. Johnstone.

What is claimed is:

1. Means for indicating synchronous speed in a synchronous motor, comprising an electric space discharge device having input and output electrodes, means for impressing a definite frequency alternating E M F on the input electrodes of said device, a direct current meter and means for connecting said motor and said meter in the output circuit of said device.

2. Means for observing for synchronous speed of a synchronous motor having windings, comprising an electric space discharge device having input and output electrodes, means for impressing a definite frequency alternating E M F on said input electrodes, and a series circuit tuned to said definite frequency connected between said output electrodes, said circuit including a winding of said synchronous motor, and a luminous discharge device connected in a path in shunt to said winding.

3. In combination, a space discharge device, an output circuit therefor, a synchronous motor and a condenser connected in the output circuit of said device, and a direct current meter connected in shunt to said condenser.

4. A device for indicating synchronous speed in a synchronous motor comprising a space discharge device having input and output circuits, means for impressing on said input circuit a wave of definite frequency, and a winding of said synchronous motor and a direct current meter connected in series in said output circuit.

5. Means for indicating synchronous speed of a synchronous motor comprising a space discharge device having input and output circuits, means for impressing a wave of definite frequency on said input circuit, a winding of said synchronous motor connected in series with a condenser in said output circuit, the inductance of said winding and the capacity of said condenser being such that said output circuit is tuned to said definite frequency, and a luminous discharge device connected in a path in shunt to said motor winding.

6. Means for indicating synchronous speed in a synchronous motor comprising an electric discharge device, means for impressing a wave of definite frequency thereon, a synchronous motor connected in the output circuit of said device, a neon tube and a resistance connected in series across the windings of said motor, and a stroboscopic device for indicating the relation of the angular velocity of the rotor of said motor to the discharges in said neon tube.

7. In combination a space discharge device having input and output circuits, means for impressing a wave of a desired frequency on said input circuit, a synchronous motor having a winding, a condenser, said winding and condenser being connected in series in said output circuit, said output circuit being tuned to resonance at the desired frequency and means for visibly indicating when said motor is operating at synchronous speed.

WARREN A. MARRISON.